(12) United States Patent
Catalano

(10) Patent No.: US 7,513,343 B2
(45) Date of Patent: Apr. 7, 2009

(54) METHOD AND CIRCUIT FOR CONTROLLING THE FLOW RATE OF THE HYDRAULIC OIL IN THE BRAKE COOLING SYSTEM OF A VEHICLE

(75) Inventor: Claudio Catalano, Milan (IT)

(73) Assignee: Astra Veicoli Industriali S.p.A., Piacenza (IT)

(*) Notice: Subject to any disclaimer, the term of this patent is extended or adjusted under 35 U.S.C. 154(b) by 92 days.

(21) Appl. No.: 11/022,735

(22) Filed: Dec. 27, 2004

(65) Prior Publication Data

US 2005/0173975 A1    Aug. 11, 2005

(30) Foreign Application Priority Data

Feb. 9, 2004 (IT) .................... MI2004A0197

(51) Int. Cl.
*F16D 65/78* (2006.01)
(52) U.S. Cl. .................. 188/264 P; 188/264 F; 188/264 D
(58) Field of Classification Search .............. 188/264 P, 188/264 R, 264 F, 264 E, 264 D, 264 B, 264 CC, 188/71.6; 192/113.3; 60/456
See application file for complete search history.

(56) References Cited

U.S. PATENT DOCUMENTS

| | | | |
|---|---|---|---|
| 3,949,844 A | 4/1976 | Larson et al. | |
| 3,969,897 A * | 7/1976 | Humphreys et al. | 60/456 |
| 4,083,469 A * | 4/1978 | Schexnayder | 414/509 |
| 4,440,272 A | 4/1984 | Bieber | |
| 4,716,730 A * | 1/1988 | Hagin et al. | 60/456 |
| 4,845,468 A * | 7/1989 | Stark | 340/454 |
| 5,050,939 A * | 9/1991 | Middelhoven et al. | 303/71 |
| 5,072,584 A * | 12/1991 | Mauch et al. | 60/378 |
| 5,178,238 A | 1/1993 | Schaeff | |
| 5,507,360 A * | 4/1996 | Simmons | 180/406 |
| 6,030,314 A * | 2/2000 | Brooks et al. | 477/92 |
| 6,314,729 B1 * | 11/2001 | Crull et al. | 60/456 |
| 6,874,857 B2 * | 4/2005 | Tanabe | 303/11 |
| 7,036,640 B2 * | 5/2006 | Spielman | 188/264 P |
| 2005/0067892 A9 * | 3/2005 | Heubner et al. | 303/113.5 |

FOREIGN PATENT DOCUMENTS

GB    1 306 272    2/1973

* cited by examiner

*Primary Examiner*—Robert A Siconolfi
*Assistant Examiner*—Mariano Sy
(74) *Attorney, Agent, or Firm*—Sampson & Assoc., P.C.

(57) ABSTRACT

A method and circuit is provided for controlling the flow rate of the hydraulic oil in the brake cooling system of a vehicle, that basically consists of the following steps: delivery of the hydraulic oil to a proportioning valve (VP) at a constant flow rate; controlled splitting of the flow rate of the hydraulic oil coming out of the proportioning valve (VP) and directed towards the hydraulic brake cooling circuit to avoid exceeding a maximum oil pressure value in the hydraulic circuit, achieved by controlling the oil temperature in the hydraulic circuit and the temperature of an engine coolant.

6 Claims, 1 Drawing Sheet

METHOD AND CIRCUIT FOR CONTROLLING THE FLOW RATE OF THE HYDRAULIC OIL IN THE BRAKE COOLING SYSTEM OF A VEHICLE

This application claims priority to Italian patent application No. MI 2004 A 000197 filed on Feb. 9, 2004.

BACKGROUND OF THE INVENTION

1. Field of the Invention

This invention relates to a method and circuit for controlling the flow rate of the hydraulic oil in the brake cooling system of a vehicle.

2. Description of the Prior Art

Some types of vehicles, especially, but not exclusively, industrial or commercial vehicles, are required to work in extremely low outdoor temperatures, where they may also be parked with the engine off for considerable lengths of time; this may be the case, for example, in arctic environments or wherever the temperature falls well below zero at night. In such conditions, when these vehicles are (re)started it takes them a long time to reach the steady state, especially as regards the temperature of the fluids, such as the engine cooling water, engine lubricating oil, transmission oil and the oil of the brake cooling system, in vehicles equipped with oil-immersed brakes.

In some industrial applications where the costs involved are particularly high and vehicles are required to work in extremely harsh environmental conditions, the braking system is housed in a sealed oil bath to guarantee high braking torques while enhancing the vehicle's service life.

Two fluids can flow through the braking chambers in different circuits:
  the brake fluid, that flows under high pressure, up to and above 100 bar;
  the brake cooling oil, that is separate from the brake fluid and ideally requires minimum backpressure levels (usually between 2 and 6 bar) which are strongly influenced by the operating temperature. The backpressure threshold depends on the type of seal that is used and prevents the risk of cross-contamination between the two oils. It is easy to maintain low backpressure levels under normal working conditions, with an oil temperature of approximately 80° C., but this becomes more of a problem in cold start conditions, with outdoor temperatures of less than 5° C., due to the significant increase in the viscosity of the oil. In order to overcome this drawback the flow rate of the cooling oil must be reduced until this has warmed up sufficiently. During this time the brakes are not fully operational, in that only a part of the oil that is available is circulating. In this phase excessive use of the brakes could cause irreversible damage.

Hence the need to optimize the method for controlling the oil flow rate during the time required for the hydraulic oil in the brake cooling system to warm up, in order to increase reliability and safety.

SUMMARY OF THE INVENTION

The purpose of this invention is to overcome all the drawbacks described above with a method and circuit for controlling the flow rate of the hydraulic oil in the brake cooling system of a vehicle by appropriately adjusting the flow rate of the hydraulic oil in the brake cooling system, especially in cold start conditions with low outdoor temperatures and cold hydraulic oil.

This invention relates to a method for controlling the flow rate of the hydraulic oil in the brake cooling system of a vehicle, consisting of the following steps:
  delivery of the hydraulic oil to a proportioning valve (VP) at a constant flow rate;
  controlled splitting of the flow rate of the hydraulic oil coming out of the proportioning valve (VP) and directed towards the hydraulic brake cooling circuit to avoid exceeding a maximum oil pressure value in such hydraulic circuit, achieved by controlling the oil temperature in the hydraulic circuit and the temperature of an engine coolant.

This invention also relates to a circuit for controlling the flow rate of the hydraulic oil in the brake cooling system of a vehicle, as described more fully in the claims, which are an integral part of this description.

BRIEF DESCRIPTION OF THE DRAWINGS

The purposes and advantages of this invention will become clear from the following detailed description of a preferred embodiment and the relative alternative forms of embodiment and the drawing that is attached hereto, which are merely illustrative and not limitative.

BEST MODE FOR CARRYING OUT THE INVENTION

Figure 1:
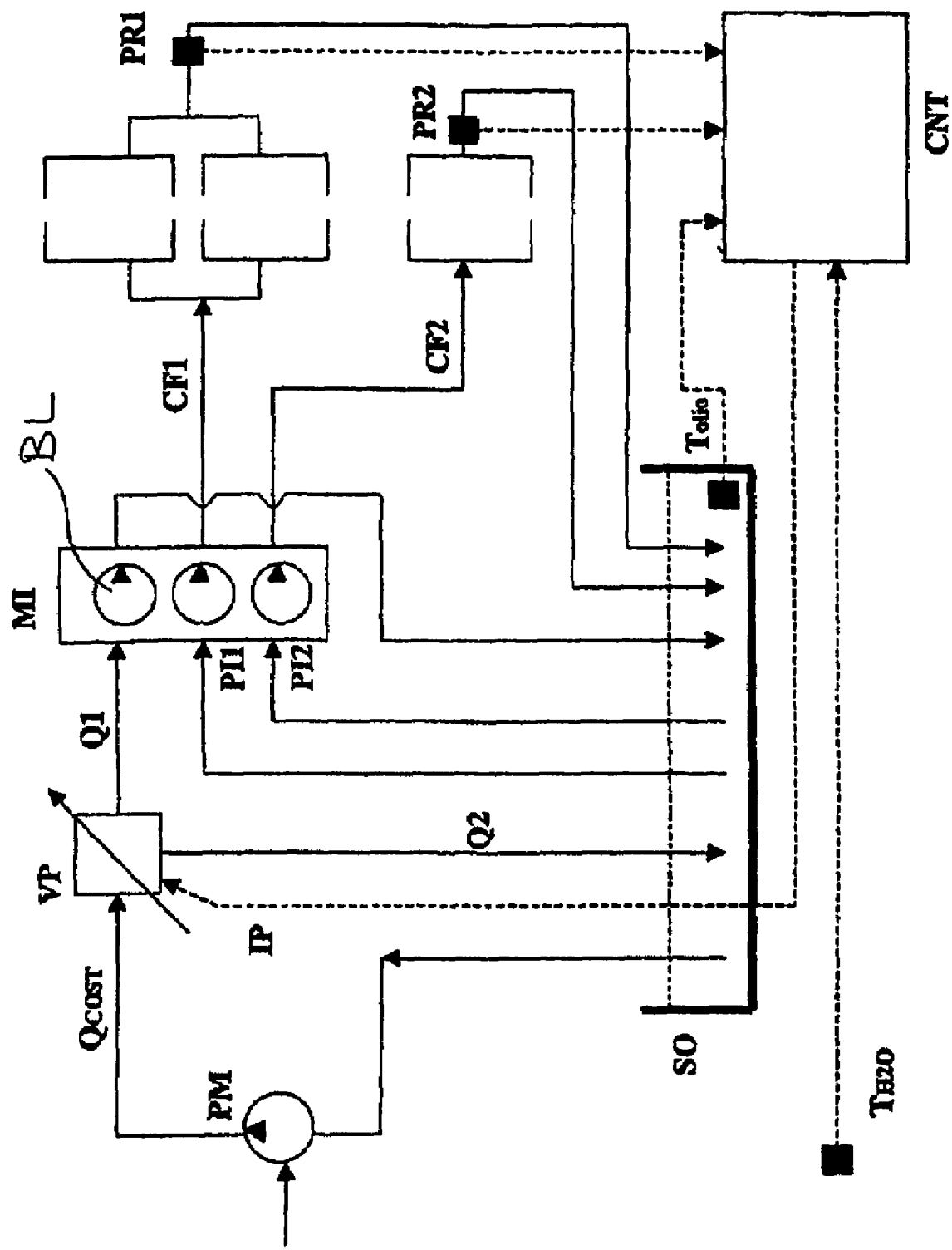
FIG. 1 is a circuit block diagram of a preferred embodiment of the method according to this invention.

With reference to FIG. 1, the vehicle is equipped with a hydraulic oil tank of any type that is known, which is illustrated schematically in the drawing and labelled SO.

A fixed flow-rate pump PM, operated by the vehicle's engine, draws up the oil from the tank SO and delivers such oil at a constant flow rate $Q_{COST}$, regardless of the number of engine revolutions. The pump may be of a known type, for example the type used in the power steering circuit. Such pump is flange-mounted on the engine: the number of revolutions varies according to the engine revolutions, but the flow rate remains constant.

The pump PM delivers the hydraulic oil to a proportioning valve VP that splits the constant input flow rate $Q_{COST}$ into one part Q1 that continues to flow through the circuit, and another part Q2 that returns to the tank, so that $Q_{COST}=Q1+Q2$.

The proportioning valve VP may be of a known type, for example the type used in hydraulic fan drives to control the oil flow according to the fan speed required.

The proportioning valve VP is controlled by an electronic control unit CNT, for example the so-called body computer that also coordinates the vehicle's engine and transmission functions. The control unit operates the valve by means of a valve drive current IP that is proportional to the delivery flow rate Q1.

The hydraulic oil leaving the proportioning valve VP supplies a hydraulic motor MI, that consists of a motor-driven pump BL that operates a certain number of hydraulic pumps (two in the example, PI1, PI2). The number of revolutions of such motor depends on the input flow rate Q1 controlled by the valve VP. In this way it is possible to control the number of revolutions and the flow rate delivered by the pumps PI1, PI2 that supply the brake hydraulic oil circuit.

If the brake circuit is divided into sections, there is one pump for each section, for example one section for the front wheels of the vehicle and one section for the rear wheels. The number of axles may also vary, for example a vehicle may have one front axle and two rear axles, but of course any number of sections of the hydraulic circuit and axles are possible.

The pumps of the hydraulic motor PI1 and PI2 draw up oil from the tank SO and deliver such oil to the relative section of the hydraulic circuit. The oil thus flows through the respective brake circuits CF1 and CF2 for cooling, and then returns to the tank SO.

Furthermore, the oil usually flows through an oil/water heat exchanger, not illustrated in the drawing, where the heat is transferred to the engine coolant, thus contributing to the cooling process.

There are pressure switches, one for each hydraulic circuit, PR1 and PR2 in the example in FIG. 1, located for example in correspondence with the brakes, that send the relative oil pressure value signals to the control unit CNT. In particular they send an electric signal when a maximum pressure value is exceeded, for example 2.5 bar.

There is an oil temperature gauge $T_{olio}$, in the tank SO, and an engine coolant temperature gauge $T_{H2O}$, located at an appropriate point on the engine cooling circuit, that send the relative temperature values to the control unit CNT.

The method according to this invention is now described. Three control parameters are used:
minimum engine coolant temperature $TL_{min}$;
minimum hydraulic oil temperature $TO_{min}$;
difference between the water and oil temperatures $\Delta_{on}$, for activation of the solenoid valve that controls the flow rate in the brake circuit.

The DutyVP parameter is defined. This parameter indicates the degree of closure of the proportioning valve VP, which is controlled by means of the current IP, and consequently the flow rate Q1 and thus the flow rate $Q_{olio}$ of the sections of the hydraulic circuit.

There are four basic conditions as regards the operation of the brake cooling circuit:

$$TL \leq TL_{min} \text{ and } TO \leq TO_{min} \qquad 1)$$

in this condition, which is typical of cold start conditions with low oil and water temperatures, the valve VP remains closed and no oil circulates through the brake circuit, so that DutyVP=100%, $Q_{olio}$=0;

$$TL \geq TL_{min} \text{ and } TO \leq TO_{min} \qquad 2)$$

in this condition, in which the water warms up more quickly than the oil:
if $TL-TO \leq \Delta_{on}$, then DutyVP=100%, $Q_{olio}$=0, as in 1);
if, on the other hand $TL-TO \geq \Delta_{on}$, the DutyVP parameter is set by means of a self-adaptive control procedure, as described below;

$$TL \geq TL_{min} \text{ and } TO \geq TO_{min} \qquad 3)$$

$$TL \leq TL_{min} \text{ and } TO \geq TO_{min} \qquad 4)$$

in conditions 3) and 4) DutyVP is set in proportion to the oil temperature. If one of the pressure switches indicates that a maximum oil pressure value has been exceeded, the parameter is adjusted by gradually increasing DutyVP until the pressure switch is deactivated. When DutyVP is increased this reduces the oil flow rate to the brakes.

The self-adaptive control of DutyVP in phase 2) consists of gradually ramping down the value of DutyVP (thus increasing the oil pressure) until one of the two pressure switches is activated, and then ramping up again until signalling stops. The valve VP is therefore gradually opened and closed and the two pressure switches are used to indicate the maximum and minimum values in the range.

In practice, in cold start conditions, the control unit opens the valve VP according to a predefined map as a function of the oil temperature. During warm-up, as the temperature of the oil circulating through the brake circuit rises, the relative flow rate also increases. If, for any reason, the pressure exceeds the fixed value, a pressure switch incorporated in the circuit sends a signal to the control unit that, on the basis of a self-adaptive algorithm, reduces the flow rate until the alarm signal is switched off.

In order to control and implement the method according to this invention, the control unit CNT processes all the data received from the sensors PR1, PR2, $T_{olio}$, $T_{H2O}$, and supplies the drive current IP to the valve VP.

An appropriate software is loaded to the control unit CNT in order to implement the procedure. From the description set forth above it will be possible for the person skilled in the art to embody such software using the ordinary programming techniques known in the prior art.

Therefore the procedure of the present invention can be advantageously implemented through a program for computer comprising program coding means for the implementation of one or more steps of the method, when this program is running on a computer. Therefore, it is understood that the scope of protection is extended to such a program for computer and in addition to a computer readable means having a recorded message therein, said computer readable means comprising program coding means for the implementation of one or more steps of the method, when this program is run on a computer.

It will be apparent to the person skilled in the art that other alternative and equivalent embodiments of the invention can be conceived and reduced to practice without departing from the true spirit of the invention. The method according to this invention is suitable for use in any vehicle, provided that it is equipped with an oil-immersed brake system of the type described above.

The advantages in connection with the use of this invention are clear.

The main advantage of a circuit according to this invention is that the flow rate of the hydraulic oil does not depend on the engine speed. In particular, the maximum flow rate can be achieved even at minimum engine speed, for example when braking to make the vehicle slow down and stop: this is the precise condition in which braking generates the most heat and requires effective cooling, and the availability of maximum pressure in the hydraulic circuit enhances the efficiency of the cooling system. If the oil flow were to be controlled directly by the engine this would result in a reduced flow rate when braking, with the risk of overheating the brake circuit.

From the description set forth above it will be possible for the person skilled in the art to embody the invention without introducing any further construction detail.

The invention claimed is:

1. A method for controlling a flow rate of a hydraulic oil in a brake cooling system of a vehicle, wherein the method comprises the steps of:
delivery of the hydraulic oil to a proportioning valve at a constant flow rate;
controlled splitting of the flow rate of the hydraulic oil coming out of the proportioning valve and directed towards a hydraulic brake cooling circuit to avoid exceeding a maximum oil pressure value in said hydraulic circuit, based on an oil temperature in the hydraulic circuit and a temperature of an engine coolant, wherein said step of controlled splitting of flow rate of the hydraulic oil coming out of the proportioning valve comprises:

defining parameters: minimum engine coolant temperature $TL_{min}$; minimum hydraulic oil temperature $TO_{min}$; difference between the coolant and oil temperatures $\Delta_{on}$; degree of closure of the proportioning valve DutyVP, and subsequent hydraulic circuit flow rate $Q_{olio}$;

checking the following conditions:

$$TL \leq TL_{min} \text{ and } TO \leq TO_{min} \qquad 1)$$

in this condition, set DutyVP=100%, $Q_{olio}$=0;

$$TL \geq TL_{min} \text{ and } TO \leq TO_{min} \qquad 2)$$

in this condition, if $TL-TO \leq \Delta_{on}$, setting DutyVP=100%, $Q_{olio}$=0;

if $TL-TO \geq \Delta_{on}$, self-adaptively controlling of the value DutyVP;

$$TL \geq TL_{min} \text{ and } TO \geq TO_{min} \qquad 3)$$

$$T \leq TL_{min} \text{ and } TO \geq TO_{min} \qquad 4)$$

in conditions 3) and 4) setting DutyVP in proportion to the oil temperature TO, so as not to exceed a maximum oil pressure value in said hydraulic circuit.

2. A method according to claim 1, wherein said self-adaptively controlling of Duty VP consists of gradually ramping down the value of Duty VP until said maximum oil pressure value has been reached, and then ramping up again.

3. A circuit for controlling a flow rate of a hydraulic oil in a brake cooling system of a vehicle during cold start conditions, wherein the circuit comprises:

a fixed flow-rate pump that delivers the oil at a constant flow rate;

a proportioning valve that splits said constant flow rate delivered by the pump into one part of the oil flow that is supplied to a hydraulic brake cooling circuit, and another part that is not used;

a control device configured to activate said proportioning valve during the cold start conditions, so as not to exceed a maximum oil pressure value in said hydraulic circuit, based on an oil temperature in the hydraulic circuit and a temperature of an engine coolant;

one or more pressure switches, supplying relative oil pressure value signals to said control device;

at least one hydraulic circuit oil temperature sensor; and at least one coolant temperature sensor supplying relative temperature value signals to said control device.

4. A circuit for controlling the flow rate of the hydraulic oil according to claim 3, wherein the output of said proportioning valve supplies a hydraulic motor, comprising a motor-driven pump that operates a certain number of hydraulic pumps, the number of revolutions of said motor depending on the partial flow rate that is delivered to said hydraulic circuit, and said certain number of hydraulic pumps supplying oil to said hydraulic brake cooling circuit.

5. A circuit for controlling the flow rate of the hydraulic oil according to claim 4, wherein said hydraulic circuit is divided into sections and there is one of said hydraulic pumps for each section.

6. A circuit for controlling the oil flow rate according to claim 5, wherein said flows through an oil/water heat exchanger, that transfers the heat to an engine coolant.

* * * * *